(12) United States Patent
Tinaphong et al.

(10) Patent No.: US 9,312,704 B2
(45) Date of Patent: *Apr. 12, 2016

(54) USB WALL PLATE CHARGER

(71) Applicant: VOXX International Corporation, Hauppauge, NY (US)

(72) Inventors: Prapan Paul Tinaphong, Carmel, IN (US); William Roger Tittle, Indianapolis, IN (US); James K. Rinehart, Indianapolis, IN (US); Yiqi W. Woodling, Carmel, IN (US); S. Ian Geise, Carmel, IN (US); Henry D. Caskey, Cicero, IN (US)

(73) Assignee: VOXX International Corporation, Hauppauge, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/736,140

(22) Filed: Jan. 8, 2013

(65) Prior Publication Data

US 2013/0175992 A1 Jul. 11, 2013

Related U.S. Application Data

(60) Provisional application No. 61/584,561, filed on Jan. 9, 2012.

(51) Int. Cl.
  *H02J 7/00* (2006.01)
  *H01R 25/00* (2006.01)
  *H01R 13/70* (2006.01)
  *H01R 24/68* (2011.01)
  *H01R 31/06* (2006.01)

(52) U.S. Cl.
  CPC .............. *H02J 7/0004* (2013.01); *H01R 13/70* (2013.01); *H01R 25/006* (2013.01); *H01R 24/68* (2013.01); *H01R 31/065* (2013.01); *H02J 2007/0062* (2013.01)

(58) Field of Classification Search
  CPC ..... H02J 7/0004; H01R 25/006; H01R 13/70; H01R 24/68
  USPC ........................................................ 320/111
  See application file for complete search history.

(56) References Cited

U.S. PATENT DOCUMENTS

| 2,636,096 | A | | 4/1953 | Di Blasi ........................ 337/189 |
|---|---|---|---|---|
| D195,463 | S | | 6/1963 | Tamarin .................... D13/137.4 |
| 4,960,384 | A | | 10/1990 | Singer et al. .................. 439/155 |
| D312,615 | S | | 12/1990 | Schwartz ...................... D13/139 |
| D316,484 | S | | 4/1991 | Kounis et al. .................. D3/104 |
| 5,313,152 | A | * | 5/1994 | Wozniak et al. .............. 320/118 |
| D348,775 | S | | 7/1994 | Scheid ........................... D3/218 |
| 5,327,065 | A | | 7/1994 | Bruni et al. ...................... 320/2 |
| D350,938 | S | | 9/1994 | Rossman et al. ............. D13/139 |

(Continued)

OTHER PUBLICATIONS

Related U.S. Appl. No. 13/736,244, filed on Jan. 8, 2013.

(Continued)

*Primary Examiner* — M'Baye Diao
(74) *Attorney, Agent, or Firm* — Gerald T. Bodner

(57) ABSTRACT

A USB wall plate charger for charging an external electronic device is mountable to a common 120 volt AC wall outlet, and includes a power supply to convert the 120 volts AC to +5 volts DC, and a charging profile configuration circuit. A charging profile selection switch is provided for the user to select a desired charging profile that is compatible with the electronic device to be charged.

11 Claims, 8 Drawing Sheets

(56) References Cited

U.S. PATENT DOCUMENTS

| | | | |
|---|---|---|---|
| D357,460 S | 4/1995 | Lovett | D13/143 |
| D361,315 S | 8/1995 | Wedell et al. | D13/160 |
| 5,619,578 A * | 4/1997 | Sondermeyer et al. | 381/61 |
| D379,160 S | 5/1997 | Johansson et al. | D11/216 |
| D401,219 S | 11/1998 | Stekelenburg | D13/137.2 |
| 5,884,086 A * | 3/1999 | Amoni et al. | 713/300 |
| D408,355 S | 4/1999 | Welsh et al. | D13/139.4 |
| 5,923,147 A | 7/1999 | Martensson | 320/111 |
| 5,955,791 A | 9/1999 | Irlander | 307/38 |
| D415,067 S | 10/1999 | Tung | D11/200 |
| D428,327 S | 7/2000 | Stekelenburg | D8/359 |
| D432,499 S | 10/2000 | Stekelenburg | D13/139.6 |
| D434,344 S | 11/2000 | Nezu | D11/216 |
| D440,203 S | 4/2001 | Ewing et al. | D13/137.2 |
| D442,550 S | 5/2001 | Tong et al. | D13/137.2 |
| D447,087 S | 8/2001 | Hodge | D11/200 |
| D461,746 S | 8/2002 | Olson et al. | D11/201 |
| D468,848 S | 1/2003 | Schenck | D26/26 |
| D469,062 S | 1/2003 | Nieto et al. | D13/137.2 |
| 6,510,067 B1 | 1/2003 | Toebes | 363/146 |
| D477,792 S | 7/2003 | Kaneko et al. | D11/200 |
| 6,614,206 B1 | 9/2003 | Wong et al. | 320/136 |
| D481,357 S | 10/2003 | Stekelenburg | D13/139.8 |
| D483,724 S | 12/2003 | Wu | D13/139.7 |
| D486,126 S | 2/2004 | Aromin | D13/137.2 |
| D495,657 S | 9/2004 | Lee | D13/137.2 |
| 6,790,062 B1 | 9/2004 | Liao | 439/171 |
| 6,821,134 B2 | 11/2004 | Chen | 439/131 |
| 6,960,727 B2 | 11/2005 | Hering | 174/135 |
| D514,067 S | 1/2006 | Lee | D13/137.2 |
| 7,050,285 B2 | 5/2006 | Sato et al. | 361/119 |
| 7,140,922 B2 * | 11/2006 | Luu et al. | 439/651 |
| 7,170,259 B2 * | 1/2007 | Veselic | 320/114 |
| 7,212,420 B2 * | 5/2007 | Liao | 363/146 |
| 7,303,416 B1 | 12/2007 | Liao | 439/173 |
| D567,708 S | 4/2008 | Jallen | D11/200 |
| D568,785 S | 5/2008 | Yang et al. | D11/218 |
| D582,346 S | 12/2008 | Zhou | D13/137.2 |
| D586,691 S | 2/2009 | Snell | D11/214 |
| D588,065 S | 3/2009 | Wadsworth et al. | D13/137.2 |
| 7,520,783 B2 | 4/2009 | Chou et al. | 439/652 |
| D606,545 S | 12/2009 | Salmon | D14/434 |
| 7,679,317 B2 * | 3/2010 | Veselic | 320/107 |
| D616,817 S | 6/2010 | Walker et al. | D13/119 |
| D618,175 S | 6/2010 | Shi | D13/137.2 |
| D619,535 S | 7/2010 | Shi | D13/137.2 |
| 7,824,051 B2 | 11/2010 | Walter et al. | 362/101 |
| 7,997,925 B2 | 8/2011 | Lam et al. | 439/535 |
| 8,072,183 B2 | 12/2011 | Griffin, Jr. | 320/107 |
| D651,974 S | 1/2012 | Benedetti | D13/137.2 |
| 8,358,100 B2 | 1/2013 | Helfrich | 320/106 |
| 9,188,325 B2 * | 11/2015 | Tinaphong | F21V 33/00 |
| 2004/0121648 A1 | 6/2004 | Voros | 439/535 |
| 2005/0041827 A1 | 2/2005 | Wu | 381/323 |
| 2005/0285562 A1 * | 12/2005 | Wu | 320/111 |
| 2007/0108938 A1 | 5/2007 | Veselic | 320/111 |
| 2007/0273325 A1 | 11/2007 | Krieger et al. | 320/106 |
| 2007/0285053 A1 * | 12/2007 | Noguchi et al. | 320/114 |
| 2008/0012536 A1 | 1/2008 | Glass | 320/165 |
| 2008/0073117 A1 | 3/2008 | Misener | 174/535 |
| 2008/0111522 A1 * | 5/2008 | Simpson et al. | 320/162 |
| 2008/0140887 A1 | 6/2008 | Gallant et al. | 710/110 |
| 2008/0150480 A1 | 6/2008 | Navid | 320/113 |
| 2008/0157715 A1 | 7/2008 | Rosenboom et al. | 320/108 |
| 2008/0164845 A1 | 7/2008 | Choi | 320/115 |
| 2008/0174265 A1 | 7/2008 | Toya | 320/107 |
| 2008/0183909 A1 * | 7/2008 | Lim et al. | 710/14 |
| 2008/0231233 A1 | 9/2008 | Thornton | 320/137 |
| 2009/0015198 A1 | 1/2009 | Brandenburg | 320/115 |
| 2009/0284219 A1 | 11/2009 | Meek | 320/107 |
| 2009/0301927 A1 | 12/2009 | Fvlbrook et al. | 206/564 |
| 2010/0029109 A1 | 2/2010 | Lam et al. | 439/136 |
| 2010/0090528 A1 | 4/2010 | Makwinski | 307/31 |
| 2010/0201308 A1 | 8/2010 | Lindholm | 320/107 |
| 2010/0219790 A1 | 9/2010 | Chadbourne et al. | 320/107 |
| 2011/0016334 A1 | 1/2011 | Tom et al. | 713/300 |
| 2011/0029703 A1 | 2/2011 | Huo et al. | 710/110 |
| 2011/0050164 A1 * | 3/2011 | Partovi et al. | 320/108 |
| 2011/0084660 A1 * | 4/2011 | McSweyn | 320/111 |
| 2011/0276734 A1 * | 11/2011 | Helfrich | 710/105 |
| 2012/0119695 A1 | 5/2012 | Pin | 320/107 |
| 2012/0169272 A1 | 7/2012 | Khalepari | 320/107 |
| 2012/0258632 A1 | 10/2012 | Lee et al. | 439/660 |
| 2013/0175977 A1 | 7/2013 | Tinaphong et al. | 320/107 |
| 2013/0176738 A1 | 7/2013 | Tinaphong et al. | |
| 2013/0260613 A1 | 10/2013 | Misener | 439/653 |
| 2014/0104805 A1 | 4/2014 | Row et al. | 361/807 |

OTHER PUBLICATIONS

Notification of Transmittal of the International Search Report and the Written Opinion of the International Searching Authority, or the Declaration (in English) dated Mar. 19, 2013, • International Search Report (in English) dated Mar. 19, 2013 and Written Opinion of the International Searching Authority (in English) dated Mar. 19, 2013, each of the above being issued by the International Searching Authority at the U.S. Receiving Office (PTO), for corresponding PCT application No. PCT/US2013/020616, filed on Jan. 8, 2013.

Related U.S. Appl. No. 13/542,828, filed on Jul. 6, 2012.

* cited by examiner

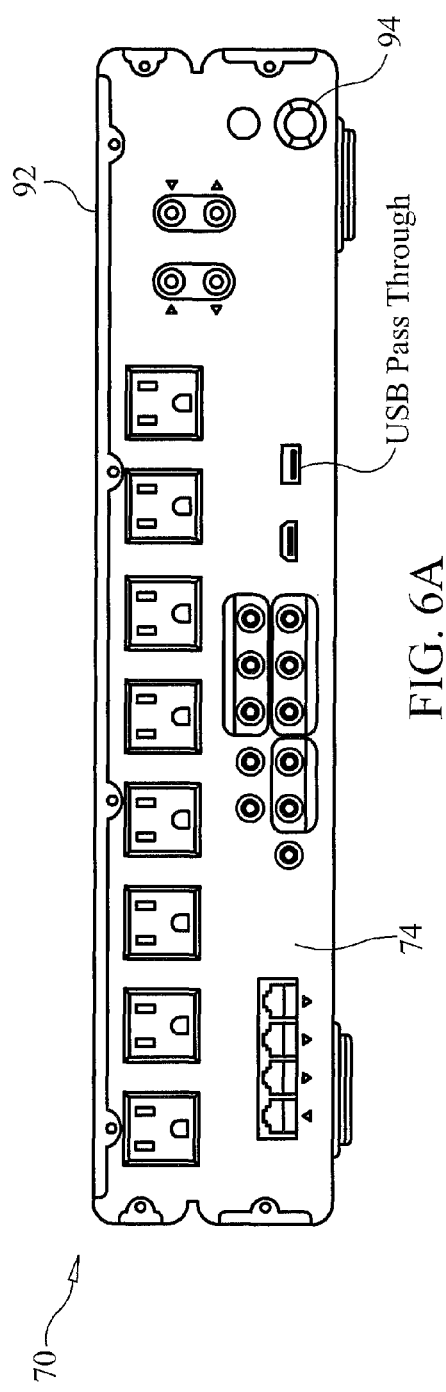
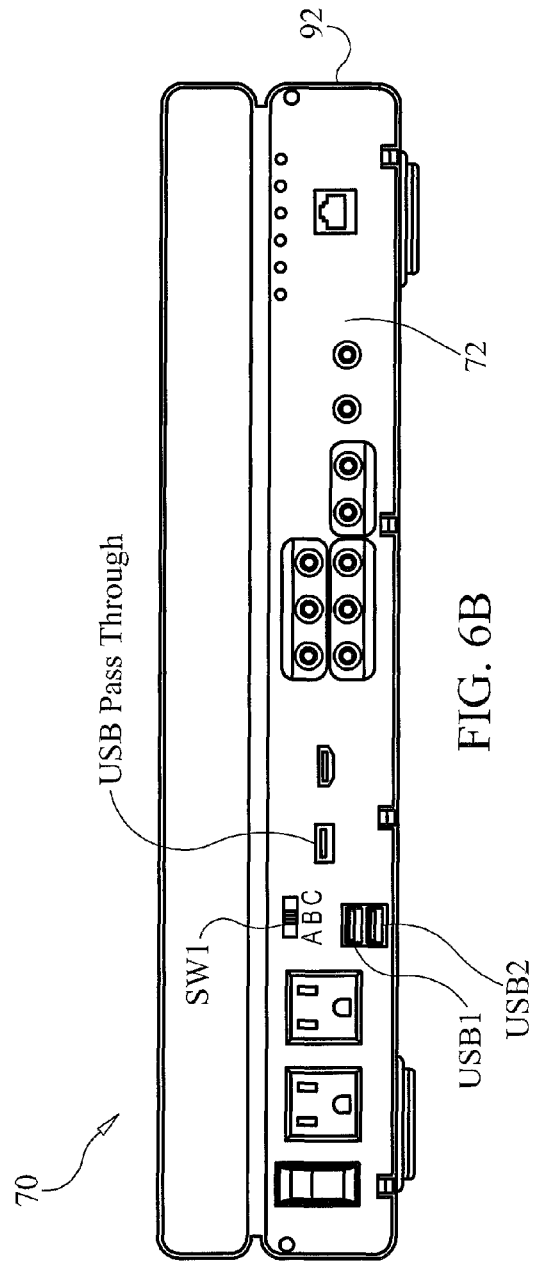
FIG. 6A
FIG. 6B

USB WALL PLATE CHARGER

CROSS-REFERENCE TO RELATED APPLICATIONS

This application is related to U.S. Provisional Application Ser. No. 61/584,561, filed on Jan. 9, 2012, and entitled "USB Wall Plate Charger", the disclosure of which is incorporated herein by reference and on which priority is hereby claimed.

BACKGROUND OF THE INVENTION

1. Field of the Invention

The present invention relates to universal serial bus (USB) USB chargers and charging circuits for charging the batteries of electronic devices.

2. Description of the Prior Art

Nowadays, there are many brands and designs of smartphones, cellular phones, Internet tablets and portable electronic devices, including the APPLE™ IPOD™, IPHONE™ and IPAD™ devices, the ANDROID™ cellular phone or tablet, and others, that use the DC power source from their internal batteries. The batteries of these devices need to be recharged through a USB port. Although the wiring configuration and charge power (charge voltage and current) allowed for normal operating range of a USB port is specified by the USB Battery Charging Specifications, nevertheless, each manufacturer of USB-compatible portable electronic devices also develops its own charging profile for its devices. The charging profile for each portable device may or may not be the same, and may vary from one device to the other, depending on the manufacturer for each portable device. Since there are several different charging profiles for these USB portable electronic devices on the market, a generic USB charger may not work or be compatible with those devices. Therefore, consumers are forced to purchase expensive USB chargers from the OEM companies for their products.

OBJECTS AND SUMMARY OF THE INVENTION

It is an object of the present invention to provide a USB wall plate charger that is receivable in a common household AC wall outlet.

It is another object of the present invention to provide a USB wall plate charger that has several user selectable charging profiles which are compatible with and which may be used to charge a variety of known electronic devices on the market.

It is yet another object of the present invention to provide a USB wall plate charger which eliminates or minimizes the need for a consumer to purchase different USB chargers for portable electronic devices that they may own.

In accordance with one form of the present invention, a USB wall plate charger is mountable to a common 120 volt AC wall outlet, and includes a power supply to convert the 120 volts AC to +5 volts DC, and a charging profile configuration circuit. A charging profile selection switch is provided for the user to select a desired charging profile that is compatible with the electronic device to be charged.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 6A is a rear view of a set top box incorporating some of the features of the USB wall plate charger and formed in accordance with the present invention.

FIG. 6B is a front view of the set top box of the present invention shown in FIG. 6A.

DETAILED DESCRIPTION OF THE PREFERRED EMBODIMENTS

Figure 1A:
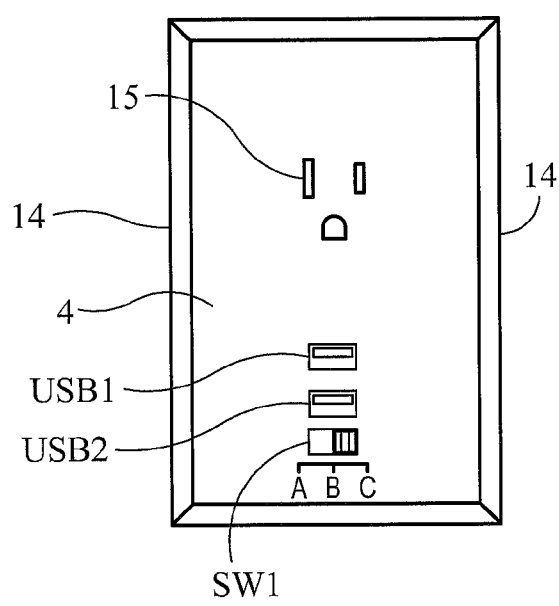
FIG. 1A is a front view of one form of a USB wall plate charger constructed in accordance with the present invention.
Figure 1B:
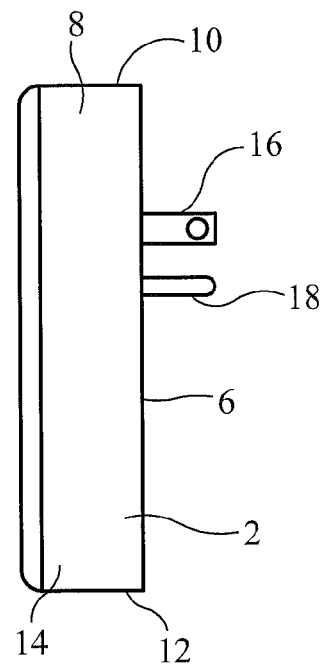
FIG. 1B is a side view of the USB wall plate charger of the present invention shown in FIG. 1A.
Figure 2A:
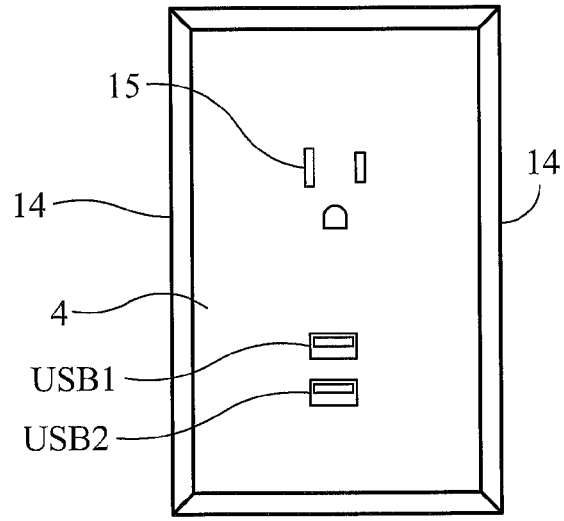
FIG. 2A is a front view of another form of a wall plate USB charger constructed in accordance with the present invention.
Figure 2B:
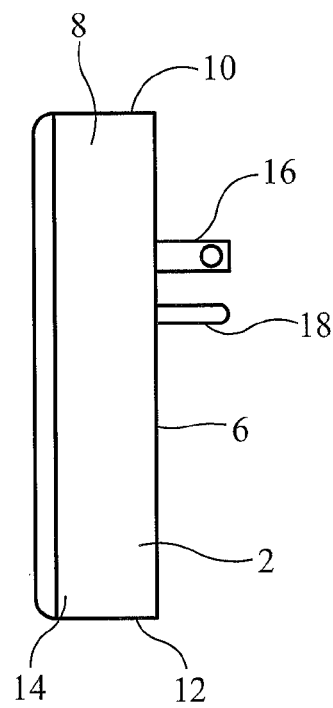
FIG. 2B is a side view of the USB wall plate charger of the present invention shown in FIG. 2A.
Figure 2C:
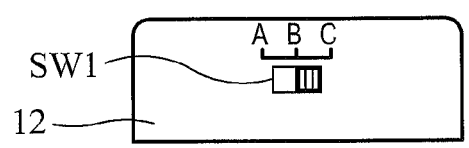
FIG. 2C is a bottom view of the USB wall plate charger of the present invention shown in FIGS. 2A and 2B.

Referring initially to FIGS. 1 and 2 of the drawings, it will be seen that a USB wall plate charger constructed in accordance with the present invention includes a housing 2 which is preferably formed with a rectangular shape, but other shapes, such as square, round, oblong or polygonal, may be suitable for forming the housing of the present invention. The housing 2 includes a front wall 4, a rear wall 6 situated opposite the front wall 4, and one or more side walls 8 interposed between the front wall 4 and the rear wall 6 of the housing. For the rectangularly-shaped housing 2 shown in FIGS. 1 and 2, the housing includes a top wall 10, a bottom wall 12 situated opposite the top wall 10 and two lateral side walls 14, defining the side walls 8 of the housing of the wall plate charger having a rectangular (or square) shape. A 120 volt AC power outlet 15 is preferably provided on the front wall 4 of the housing 2.

A pair of male electrical prongs 16 and a male ground prong 18 extend perpendicularly from the rear wall 6 of the housing of the USB wall plate charger of the present invention. The male prongs 16, 18 are receivable by female contacts of a typical AC wall outlet (not shown) found in a household residence or business establishment. Thus, the USB wall plate charger of the present invention may be mounted on, and supported by, the conventional AC wall outlet, and receive power therefrom to power the electronic circuit within the housing 2 and to provide power to the AC outlet 15. More specifically, the housing 2 defines an internal cavity in which the electronic circuit for the charger is situated.

Preferably, the USB wall plate charger includes one or more, but preferably two, USB ports USB1 and USB2 mounted on the front wall 4 of the housing 2 to be accessible by a user. Charging power (voltage and current) is provided to each USB port. A user may plug in a charging cable having a compatible USB connector, which may interface with an external portable electronic device so that the batteries of the device may be charged by the USB wall plate charger of the present invention.

The USB wall plate charger of the present invention further includes a slide, toggle or other type of switch SW1 mounted on the housing 2 and exposed thereon for the user to engage with his fingers to select a particular charging profile for charging different portable electronic devices. In FIG. 1, the charging profile selection switch SW1 is shown mounted on the front wall 4 of the housing. In FIG. 2, the charging profile selection switch SW1 is shown mounted on the bottom wall 12 of the housing. It should be realized, of course, that the charging profile selection switch may be mounted anywhere on the housing 2 as long as it is exposed to the user so that he may manipulate the switch to select a particular charging profile in accordance with the requirements of the particular electronic device to be charged.

With the USB wall plate charger of the present invention, consumers can plug a USB cable directly into the wall plate and then select one of three different groups of charging profiles corresponding to positions "A", "B" or "C", for example, on the switch SW1, which profiles provide pre-configured voltages on select pins of the USB ports.

At the "A" position of the charging profile selection switch SW1, the USB wall plate charger of the present invention is configured in its internal wiring of the electronic circuit within the housing to provide on at least one USB port voltages which are compatible and able to charge any device that is manufactured by or for APPLE™ Computer, such as the APPLE™ IPOD™, IPHONE™, ITOUCH™ and IPAD™ devices.

At the "B" position of the charging profile selection switch SW1, the USB wall plate charger is configured in its internal wiring of the electronic circuit within the housing to provide the required voltages on the pins of at least one of the USB ports that are compatible and able to charge any device that is manufactured by RESEARCH IN MOTION™ (RIM™) for the BLACKBERRY™ devices. Also, some of the portable USB-compatible electronic devices that use a similar charging profile as the BLACKBERRY™ device also may be charged by the USB wall plate charger of the present invention with the selection switch in the "B" position.

When the charging profile selection switch SW1 is in the "C" position, the USB wall plate charger of the present invention is configured in its internal wiring of the electronic circuit within the housing to be compatible with and able to charge any device that is manufactured by Samsung Electronics Co., Ltd. for the ANDROID™ smartphones or tablets, or any other ANDROID™ devices by other manufacturers beside SAMSUNG™. Some of the other portable USB-compatible electronic devices that use a similar charging profile as the SAMSUNG™ devices may also be charged by the USB wall plate charger of the present invention, such as some ANDROID™ smartphones and tablets that are manufactured by companies other than SAMSUNG™.

As mentioned previously, the USB wall plate charger of the present invention preferably includes two USB ports USB1, USB2. One of the ports USB2 is designated to supply 2.1 amperes of current, and the other port USB1 is designated to supply 1 ampere of current. The 2.1 ampere port USB2 is designed to charge the APPLE™ IPAD™ device or the SAMSUNG™ GALAXY™ tablet, which require a higher current source (1.8 amperes for the SAMSUNG™ tablet and 2.1 amperes for the APPLE™ device). The 1 ampere USB port USB1 is designed for any USB portable device that requires a charging current of 1 ampere or less.

Figure 3A:
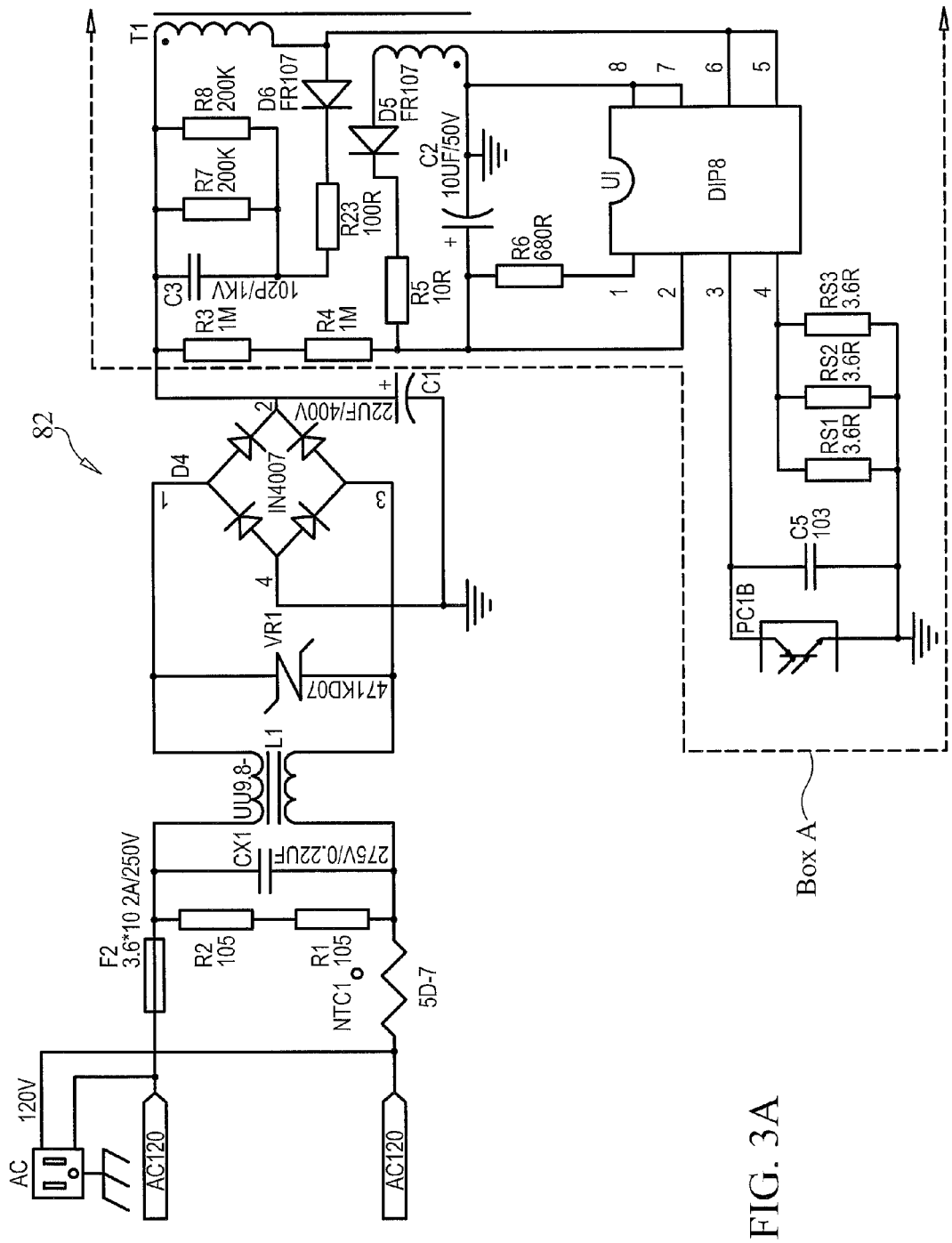
FIGS. 3A, 3B and 3C are portions of a schematic diagram of the electronic circuit used in the USB wall plate charger and formed in accordance with the present invention.
Figure 3B:
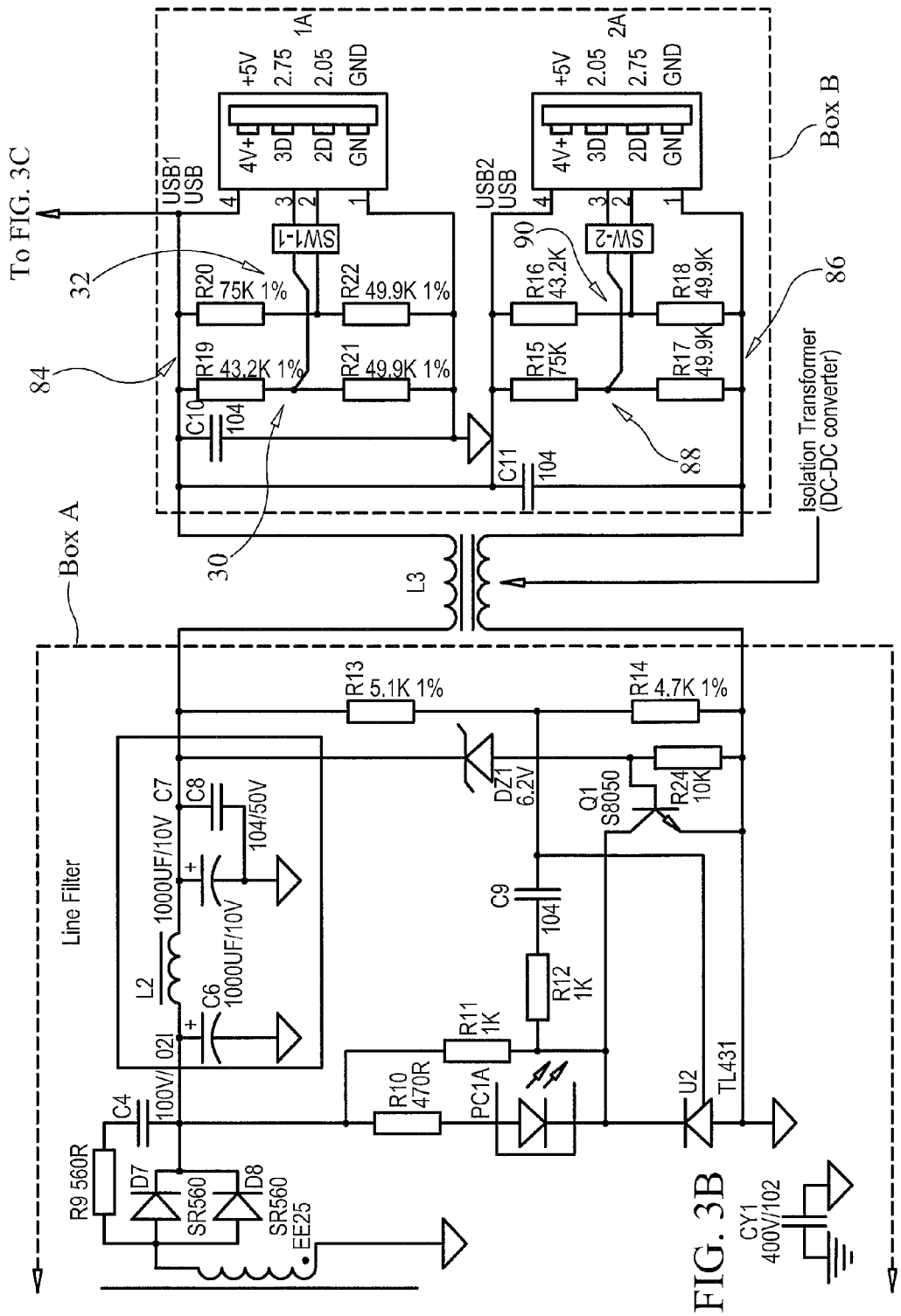
Figure 3C:
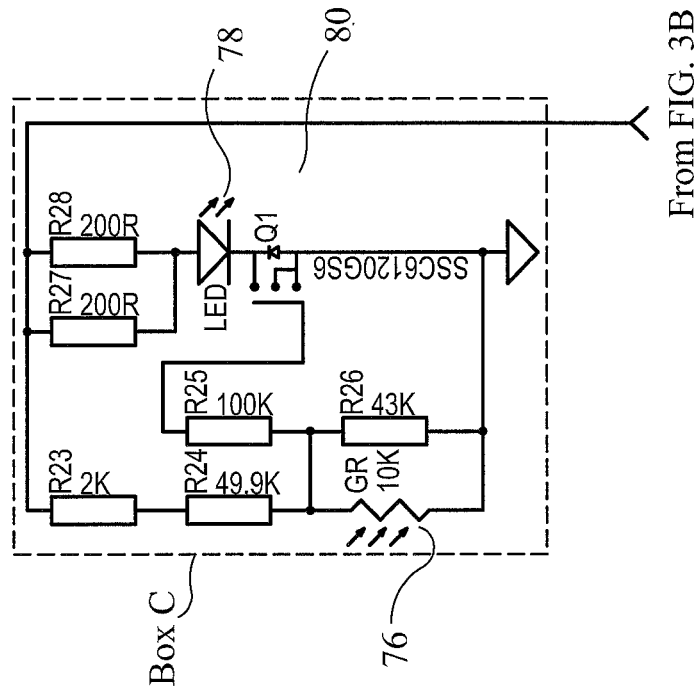

FIG. 3 shows a schematic diagram of a preferred form of an electronic circuit for use with the USB wall plate charger of the present invention. The electronic circuit is situated within the internal cavity of the housing 2. Basically, the electronic circuit includes a power supply which converts 120 volts AC to +5 volts DC, and one or more charging profile configuration circuits which provide certain voltages on the D− (DATA−) and D+ (DATA+) pins of the USB ports. The charging profile configuration circuits are disclosed in U.S. Patent Application Ser. No. 61/571,878, filed on Jul. 7, 2011, and entitled "Current Selectable USB Charger", and U.S. patent application Ser. No. 13/542,828, filed on Jul. 6, 2012, and entitled "Current Selectable USB Charger", the disclosure of each of which is incorporated herein by reference.

The power supply section 82 of the electronic circuit of the USB wall plate charger of the present invention is shown to the left of the Box A shown in FIG. 3. The power supply circuit takes the 120 volts AC provided by the wall outlet in which the charger of the present invention is mounted, converts it to a lower voltage through transformer L1, and includes a full wave rectifier to convert the voltage to a DC voltage, which is filtered by capacitor C1. A DC-to-DC switching voltage regulator circuit, which includes a power switch integrated circuit U1 having Part No. LY9601 manufactured by Stronglink Tech. Co., Ltd. (the Stronglink application notes for Part No. LY9601, which are incorporated herein by reference, show the interconnection of the power switch circuit to the external components shown in Box A in FIG. 3) provides a 5 volt DC voltage that can supply two or more amperes of current on the first USB port USB1 and on the second USB port USB2. The optical sensor diode PC1A and PC1B is part of the feedback control for the switching integrated circuit U1. The circuit to the left of Box B in FIG. 3 basically constitutes a switched mode power supply. The transformer L3 is an isolation transformer and capacitors C10 and C11 in Box B smooth the modulated DC voltages to provide a ripple-free +5 volts DC on Pin 4 on the first and second USB ports USB1 and USB2. It should be noted herein that, although the electronic device connected to the first port USB1 or the second port USB2 "thinks" that the first and second ports can only supply 1.0 ampere or 2.0 amperes of current, respectively, due to the selection of resistors comprising the first and second charging profile configuration circuits and the voltages provided on the D+ and D− pins of the USB ports USB1 and USB2, in reality, each USB port can supply about 2.0 amperes of current, or more, with the power supply shown in FIG. 3.

Five volts DC is provided on pin 4 of each of the two USB ports USB1 and USB2. Pin 1 on each of the USB ports USB1 and USB2 is connected to ground. Pin 2 on each of the first and second USB ports USB1 and USB2 is the DATA− (D−) pin, and pin 3 on each of the first and second USB ports USB1 and USB2 is the DATA+ (D+) pin. The DATA+ and DATA− pins are connected to voltage divider networks formed of series connected pairs of resistors connected between the +5 volt DC and ground and which are switchable in accordance with the charging profile selection switch provided on the housing to provide different voltages on the D+ and D− pins 2, 3 of each of the first and second USB ports USB1 and USB2 so that the consumer can charge different external electronic devices with selectable charging profiles that are compatible with the electronic device being charged. For example, the voltage divider networks may provide +2.75 volts on the D+ pin 3, and +2.05 volts on the D− pin 2 of the first, one ampere USB port USB1 depending on the position ("A", "B" or "C") of the charging profile selection switch selected by the user, and may provide +2.0 volts on the D+ pin 3, and +2.75 volts on the D– pin 2 of the second, two ampere USB port USB2, again depending upon the position of the charging profile selection switch selected by the user. Of course, it is envisioned to be within the scope of the present invention to use other power supply circuits well known in the art which convert 120 volts AC to 5 volts DC. The values of the components set forth in FIG. 3 are for illustrative purposes only, and different values may be suitable for operation of the power supply circuit of the charger of the present invention.

FIG. 3 illustrates in Box B two charging profile configuration circuits, one circuit 84 for the first USB port USB1 having a 1 ampere charging current capability, and another circuit 86 for the second USB port USB2 having a 2 ampere charging current capability. More specifically, a first voltage divider network includes resistor R19 and resistor R21, which are connected in series between +5 volt DC and ground, and a second voltage divider network consisting of resistors R20 and R22, also connected in series between the +5 volts DC and ground. The junction of resistors R19 and R21, and the junction of resistors R20 and R22, are provided through switch SW1, whose outputs are provided to the D+ pin 3 and D– pin 2 of the first USB port USB1.

A third voltage divider network consisting of resistor R15 and resistor R17, connected in series, is coupled between +5 volts DC and ground. Furthermore, a fourth voltage divider network consisting of resistors R16 and R18, also connected in series, is coupled between +5 volts DC and ground. The junction of resistors R15 and R17, and the junction of resistors R16 and R18, are provided to switch SW2, whose outputs are provided to the D+ pin 3 and D– pin 2 of the second USB port USB2. The first and second voltage divider networks consisting of resistors R19-R22 provide certain voltages on the D+ pin 3 and the D– pin 2 of the first USB port USB1, depending upon the position that the switch SW1 is in, and similarly, the third and fourth voltage divider networks consisting of resistors R15-R18 provide certain voltages on the D+ pin 3 and the D– pin 2 of the second USB port USB2, depending upon the position that switch SW2 is in. Switches SW1 and SW2 may be ganged together, double pole, double throw or double pole, triple throw switches, such as the charging profile selection switch disclosed previously, or may be separate switches mounted on the housing of the USB wall plate charger to control separately the charging profiles for each of the first and second USB ports USB1 and USB2.

Figure 4:
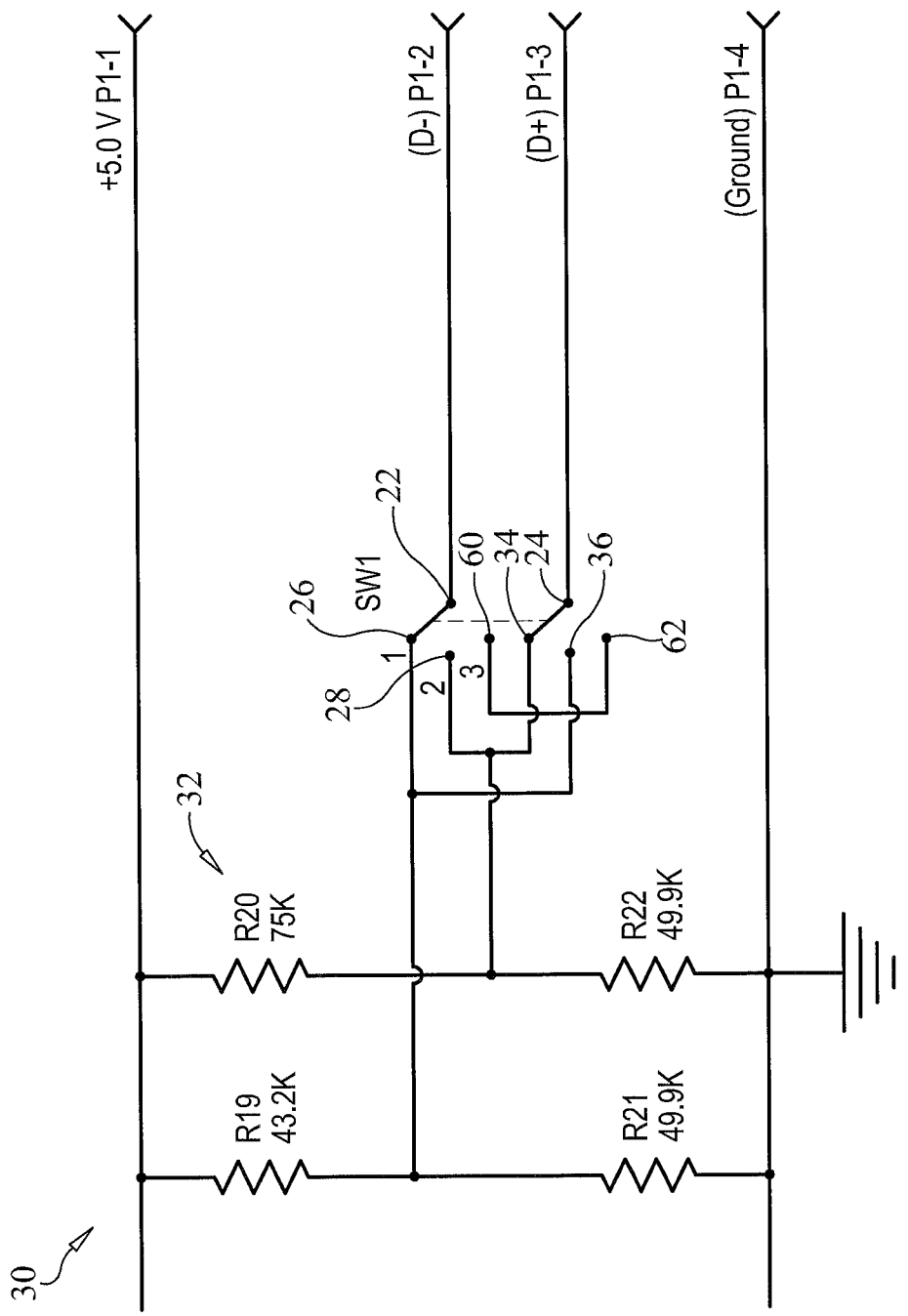
FIG. 4 is a schematic diagram of a portion of the electronic circuit used in the USB wall plate charger and formed in accordance with the present invention.

FIG. 4 is a schematic diagram of one portion of the charging profile configuration circuit of the charger of the present invention, which provides certain voltages to the D+ and D– pins, through switch SW1, for the first USB port USB1. Here, it can be seen that resistor R19 of the first voltage divider network is preferably 43.2K ohms, and resistor R21 of the first voltage divider network is preferably 49.9K ohms. Furthermore, resistor R20 of the second voltage divider network is preferably 75K ohms, and resistor R22 of the second voltage divider network is preferably 49.9K ohms Switch SW1 is shown as a double pole, triple throw switch having two wipers or common contacts.

More specifically, the first wiper or common contact 22 of the first section of the switch SW1 is connected to the D– pin 2 of the first USB port USB1. Also, the second wiper or common contact 24 of the second section of the switch SW1 is connected to the D+ pin 3 of the first USB port USB1. The first output contact 26 of the first section of the switch SW1 is connected to the resistor junction of the first voltage divider network 30, and the second output contact 28 of the first section of the switch SW1 is connected to the resistor junction of the second voltage divider network 32.

The first output contact 34 of the second section of the switch SW1 is connected to the resistor junction of the second voltage divider network 32, and the second output contact 36 of the second section of the switch SW1 is connected to the resistor junction of the first voltage divider network 30.

The third output contact 60 of the first section of the switch SW1 is connected to the third output contact 62 of the second section of the switch SW1, and the third contacts 60, 62 are not connected to either voltage divider network 30, 32 and are, in essence, floating, at least when the USB port USB1 is not connected to an external electronic device. The various switch positions are labeled as 1, 2 and 3 in FIG. 4. When the switch SW1 is in the first (1) position, the charger appears to the electronic device to be a 2.1 ampere source due to the voltages appearing on the D– and D+ pins of the first port USB1, and the charging circuit may charge on the first USB port USB1 an APPLE™ IPAD™ device.

When the switch SW1 is in the second (2) position, the charger appears to the electronic device to be capable of supplying about 1.0 ampere of current due to the voltages on the D– and D+ pins of the first port USB1, and the charging circuit may charge on the first USB port USB1 an APPLE™ IPHONE™ or IPOD™ device, or a BLACKBERRY™ device.

When switch SW1 is in the third (3) position, the charger appears to the electronic device to be capable of supplying about 1.8 amperes of current due to the voltages on the D– and D+ pins of the first USB1, and the charging circuit may charge on the first USB port USB1 a BLACKBERRY™ PLAYBOOK™ device or a SAMSUNG™ device.

The second charging protocol configuration circuit, which provides certain voltages to the D– pin 2 and D+ pin 3 on the second USB port USB2 through switch SW2 includes the third and fourth voltage divider networks consisting of resistors R15 and R17, and resistors R16 and R18, respectively. Preferably, and as shown in FIG. 3 of the drawings, resistor R15 of the third voltage divider network is preferably 75K ohms, and resistor R17 of the third voltage divider network is preferable 49.9K ohms. Also, resistor R16 of the fourth voltage divider network is preferably 43.2K ohms, and resistor R18 of the fourth voltage divider network is preferably 49.9K ohms. Switch SW2 has a similar wiring arrangement as that of switch SW1 shown in FIG. 4 of the drawings to provide through switch SW2 certain voltages on the D– pin 2 and D+ pin 3 of the second USB port USB2, to charge the batteries of different electronic devices connected thereto.

Figure 5:
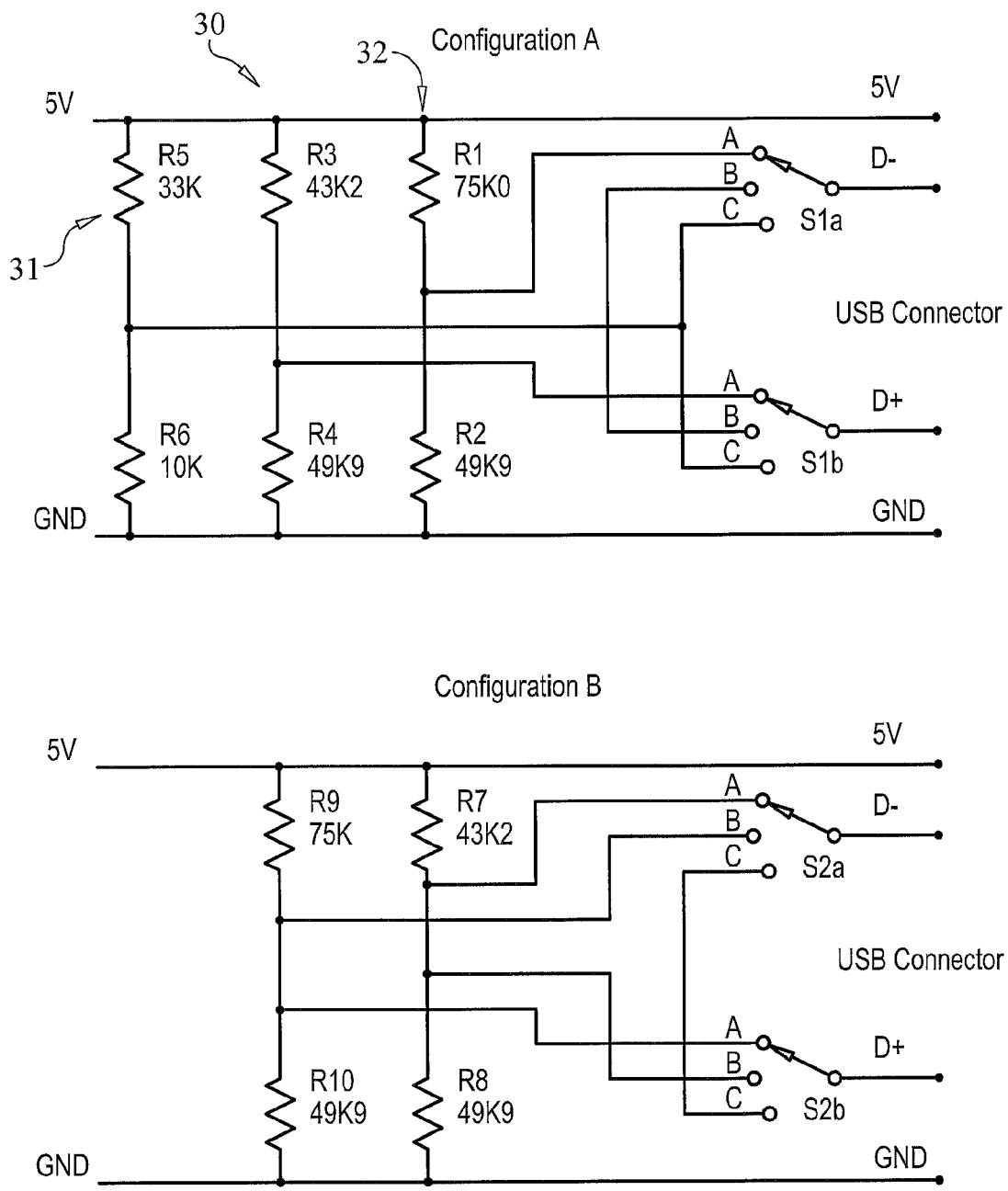
FIG. 5 is a schematic diagram of an alternative form of the circuit portion shown in FIG. 4 and used in the USB wall plate charger of the present invention.

FIG. 5 illustrates a schematic diagram of two different possible configurations for at least one of the USB ports USB1 and USB2. In configuration A shown in FIG. 5 of the drawings, there are three voltage divider networks which are provided between +5 volts DC and ground, and which are connected to a double pole, triple throw switch having two sections, S1A and S1B. The contacts of switch section S1A, and comparable contacts of switch section S1B, are labeled with reference letters "A", "B" and "C". The first and second voltage divider networks 30, 32 described previously and shown in FIG. 4 of the drawings are the same as the voltage divider networks consisting of resistors R3 and R4, and resistors R1 and R2, respectively, and their preferred values are the same as described previously with respect to the first and second voltage divider networks 30, 32 which work in conjunction with switch SW1. Contact B of switch section S1A is connected to contact B of switch section S1B and is floating. However, instead of having the third contacts 60, 62 of the first and second sections of the switch SW1, shown previously in FIG. 4 of the drawings, floating and not connected to the external electronic device, the contacts labeled with reference letter "C" of switch section S1A and switch section S1B are joined together but are also connected to the junction of an additional voltage divider network 31 having series connected resistor R5 and resistor R6, the series combination of resistors being connected between +5 VDC and ground. Resistor R5 is preferably 33K ohms, and resistor R6 is preferably 10K ohms.

When the charging protocol configuration circuit of configuration A shown in FIG. 5 of the drawings has the switch in position A, APPLE™ devices requiring 2.1 amperes of charging current may be charged. When the switch is in position B, generic electronic devices, and in particular, smartphones, and the BLACKBERRY™ devices may be charged. When the switch is in position C, the SAMSUNG™ tablet device may be charged.

The charging protocol configuration circuit shown in FIG. 5 as configuration B is the same as the charging protocol configuration circuit shown in FIG. 3 of the drawings and consisting of resistors R15-R18. More specifically, resistor R9 is the same as resistor R15 and has the same preferred resistance, resistor R10 is the same as resistor R17 and has the same preferred resistance, resistor R7 is the same as resistor R16 and has the same preferred resistance, and resistor R8 is the same as resistor R18 and has the same preferred resistance. The only differences are that contact A of switch section S2A is connected to the junction of resistors R7 and R8, contact B of switch section S2A is connected to the junction of resistors R9 and R10 and contact C of switch section S2A is connected to contact C of switch section S2B and is floating. Furthermore, contact A of switch section S2B is connected to the junction of resistors R9 and R10, and contact B of switch section S2B is connected to the junction of resistors R7 and R8.

Thus, with the charging protocol configuration circuit of configuration B shown in FIG. 5, when the switch is in the "A" position, an APPLE™ device requiring one ampere of current may be charged. When the switch is in position "B", an APPLE™ device requiring 2.1 amperes of current may be charged. When the switch is in position "C", a BLACKBERRY™ or generic devices, such as smartphones, may be charged.

By using the USB wall plate charger of the present invention, all or almost all USB portable devices will sense the charger as a power supply by the separate combinations of the pre-arranged wiring with the D+ and D− data lines on the USB ports, which will help to initialize the charging process by the devices as if they are just connected to a power supply for 5 volts DC USB.

It is envisioned to be within the scope of the present invention to include a USB wall plate charger in which the charging profile selection switch SW1 is omitted. In such an embodiment, the voltage divider networks (for example, four such networks) having series-connected resistors, such as networks 30, 32 described previously, may have their junctions connected directly to the D− pin 2 and D+ pin 3 of the first USB port USB1 and the second USB port USB2. For example, the resistor junction of a first voltage divider network may be connected directly to the D− pin 2 of the first USB port USB1, without passing through a charging profile selection switch, to provide a predetermined voltage on the D− pin 2 of the first USB port USB1. Similarly, the resistor junction of a second voltage divider network may be connected directly to the D+ pin 3 of the first USB port USB1, without passing through the selection switch, to provide a predetermined voltage on the D+ pin 3 of the first USB port USB1.

Also, the resistor junction of a third voltage divider network may be connected directly to the D− pin 2 of the second USB port USB2, without passing through a charging profile selection switch, to provide a predetermined voltage on the D− pin 2 of the second USB port USB2. Similarly, the resistor junction of a fourth voltage divider network may be connected directly to the D+ pin 3 of the second USB port USB2, without passing through the selection switch, to provide a predetermined voltage on the D+ pin 3 of the second USB port USB2.

Thus, the two USB ports USB1, USB2 may be pre-configured with charging profile voltages, without the use of a charging profile selection switch, so as to be compatible with the charging profiles required by most, if not all, APPLE™, BLACKBERRY™, SAMSUNG™, or ANDROID™ devices.

The power supply (or an alternative power supply), charging profile configuration circuit or circuits and charging profile selection switch or switches disclosed herein may be incorporated in a set top box 70. Such a set top box 70 is shown in FIGS. 6A and 6B of the drawings.

As can be seen from FIGS. 6A and 6B, preferably the charging profile selection switch SW1 and at least one, but preferably two, USB ports, USB1 and USB2, are mounted on the front panel 72 or the rear panel 74 of the set top box 70. Thus, the set top box 70 conveniently allows consumers to plug in most any portable device (iPad™ IPAD™ device, ANDROID™ device, camcorder, digital camera, or the like) into the front panel 72 (or rear panel 74) and connecting to a TV set. All connectors from the front panel 72 are directly fed through the rear panel 74, and then connect to a TV. In an alternative embodiment, the set top box 70 may omit the charging profile selection switch SW1 or switches SW1, SW2 and have its USB ports USB1, USB2 pre-configured with select charging profile voltages on their D− and D+ pins, as described previously. The set top box 70 would include the AC-to-DC power conversion circuit 82, and the charging profile configuration circuit or circuits 84, 86, such as described previously in connection with the USB wall plate charger, or circuits which function in a similar manner thereto.

In another preferred embodiment of the present invention, the USB wall plate charger may include a nightlight feature. This feature is shown in FIGS. 3, 7A and 7B of the drawings.

Figure 7A:
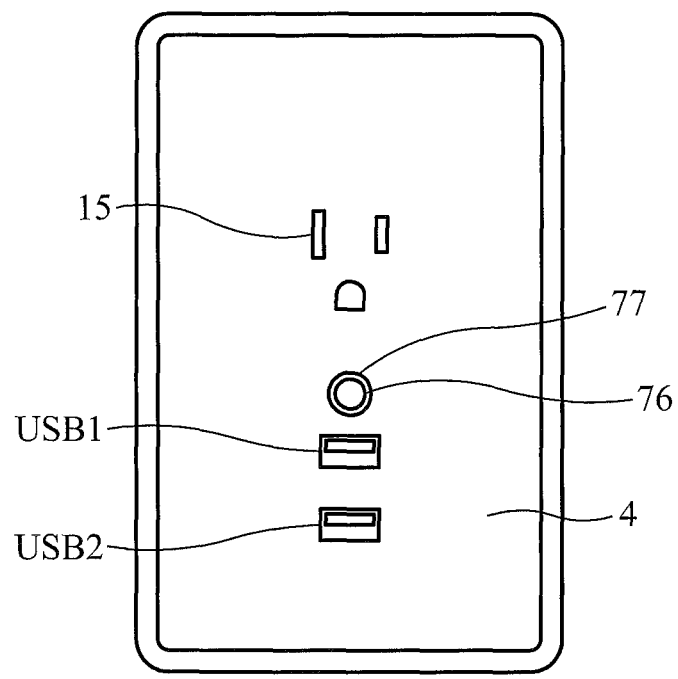
FIG. 7A is a front view of another form of a USB wall plate charger constructed in accordance with the present invention and having a nightlight feature.
Figure 7B:
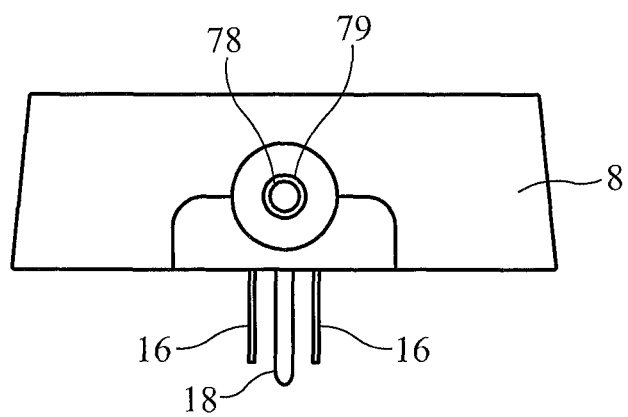
FIG. 7B is a side view of the USB wall plate charger of the present invention shown in FIG. 7A and having the nightlight feature.

More specifically, and with reference to FIGS. 7A and 7B, a photocell 76 forming part of the nightlight feature is mounted on, or exposed through an opening 77 formed in, one of the walls of the housing 2 of the USB wall plate charger, preferably the front wall 4, as shown in FIG. 7A. The photocell 76 detects ambient light conditions in the area of the room or environment in which the USB wall plate charger is placed, and generates an output signal whose voltage varies in correspondence to the area ambient light conditions.

A light emitting device 78, such as a light emitting diode (LED), incandescent light bulb, fluorescent light bulb and the like, is mounted on, or exposed through an opening 79 formed in, another wall of the housing, preferably a side wall 8, as shown in FIG. 7B, so that, when the light emitting device 78 receives power and is illuminated, it will direct light to at least some portion of the area of the room or environment in which the USB wall plate charger is placed. The light emitting device 78 is preferably positioned on the housing 2 on a wall thereof which is different from the wall on which the photocell 76 is positioned so that the light emanating from the light emitting device 78 will not be sensed by the photocell 76 and thus will not have an effect on the output signal of the photocell.

A schematic diagram of the nightlight electronic circuit is shown in Box C in FIG. 3. The nightlight circuit of the USB wall plate charger includes a control circuit 80 to which the photocell 76 and the light emitting device 78 are electrically connected. The control circuit 80 receives a rectified and filtered voltage (e.g., +5 VDC), which is derived from the AC power present on the AC wall outlet 15 on which the wall plate charger is mounted, as described previously. The output signal from the photocell 76 is provided to the control circuit 80 which, in response thereto, will provide power (voltage and current) to the light emitting device 78 to illuminate the device, depending on the ambient light conditions of the area of the room or environment in which the USB wall plate charger is mounted. At low ambient light conditions, sensed by the photocell 76, the control circuit 80, in response to the photocell's output signal, will cause the light emitting device 78 to illuminate by providing power thereto. However, in high ambient light conditions, sensed by the photocell 76, the control circuit 80, in response to the photocell's output signal, will cut off power to the light emitting device 78 so that the device 78 will not illuminate.

More specifically, and as shown in FIG. 3, the photocell 76 (designated as "GR" in Box C) forms part of a biasing circuit with series connected resistors R23 and R24, and resistors R25 and R26, resistor R26 being connected to the gate of MOSFET Q1, which is preferably Part No. SSC6120GS6 manufactured by Spirit Semiconductor (Spirit Technology Co., Ltd.) having an office in Hong Kong. The drain of transistor Q1, forming part of the control circuit 80, is connected to the cathode of a light emitting diode (LED) 78, whose anode is connected through parallelly connected resistors R27 and R28 to +5 volts DC. The source of transistor Q1 is connected to ground. The resistance of photocell 76, which varies in response to the ambient light conditions, will bias transistor Q1 on or off, thereby either allowing current to flow through the LED 78 to illuminate the LED, or preventing current from flowing through the LED 78, which then will not emit light.

To restate some of the features of the USB wall plate charger of the present invention, the charger is mountable on an AC wall outlet 15 and may be used for charging an external electronic device. The USB wall plate charger includes a housing 2, the housing 2 having a first wall 6 and at least a second wall 4, 8, the housing 2 defining an interior cavity. The charger also includes power outlet prongs 16 mounted on and extending outwardly from the first wall of the housing. The power outlet prongs 16 are receivable by an AC wall outlet (not shown) to allow the USB wall plate charger to be mounted on and supported by the AC wall outlet.

The USB wall plate charger also includes at least one USB port USB1 situated on the at least second wall 4, 8 of the housing 2. The at least one USB port USB1 includes a charge pin (Pin 1), a DATA+ pin (Pin 3) and a DATA− pin (Pin 2). The at least one USB port USB1 is provided with a charge voltage on the charge pin thereof for charging an external electronic device electrically connected to the at least one USB port USB1, a first configuration voltage on one of the DATA+ pin and the DATA− pin thereof and a second configuration voltage on one of the DATA− pin and the DATA+ pin thereof.

The USB wall plate charger further includes a power conversion circuit 82 situated within the interior cavity of the housing. The power conversion circuit 82 is electrically coupled to the power outlet prongs 16 and converts an AC voltage provided on the AC wall outlet on which the USB wall plate charger is mounted to a DC voltage. The charge voltage provided to the charge pin (Pin 1) of the at least one USB port USB1 is derived from the DC voltage from the power conversion circuit 82.

Also, the USB wall plate charger includes at least one charging profile configuration circuit 84 or 86 situated within the interior cavity of the housing 2. The at least one charging profile configuration circuit 84 or 86 is responsive to the DC voltage from the power conversion circuit 82 and generates the first configuration voltage provided to one of the DATA+ pin (Pin 3) and the DATA− pin (Pin 2) of the at least one USB port USB1 and the second configuration voltage provided to one of the DATA− pin and the DATA+ pin of the at least one USB port.

In a preferred form of the present invention, the USB wall plate charger further includes a charging profile selection switch SW1 on the housing 2. The charging profile selection switch SW1 is selectively changeable between at least a first state and a second state. The charging profile selection switch SW1 is responsive to the first configuration voltage and the second configuration voltage provided by the at least one charging profile configuration circuit 84 or 86 and provides the first configuration voltage to the DATA+ pin and the second configuration voltage to the DATA− pin of the at least one USB port USB1 when the charging profile selection switch SW1 is in the first state, and provides the first configuration voltage to the DATA− pin and the second configuration voltage to the DATA+ pin when the charging profile selection switch SW1 is in the second state.

In a more specific form of the USB wall plate charger of the present invention, the at least one charging profile configuration circuit 84 or 86 includes at least a first voltage divider network 30 and a second voltage divider network 32. The first voltage divider network 30 generates the first configuration voltage, and the second voltage divider network 32 generates the second configuration voltage. Preferably, the first voltage divider network 30 includes at least a first resistor R19 and a second resistor R21, the first resistor R19 being connected in series with the second resistor R21, and the second voltage divider network 32 includes at least a third resistor R20 and a fourth resistor R22, the third resistor R20 being connected in series with the fourth resistor R22.

In an even more preferred form of the present invention, the USB wall plate charger has a nightlight feature, which includes a photocell 76, the photocell 76 being at least one of mounted on and exposed through a first opening formed in the housing 2. The photocell 76 senses ambient light conditions and generates an output signal in response thereto. A control circuit 80 is situated within the interior cavity of the housing 2. The control circuit 80 is responsive to the output signal of the photocell 76 and generates a control signal in response thereto. A light emitting device 78 is at least one of mounted on and exposed through a second opening formed in the housing 2. The light emitting device 78 selectively illuminates in response to the control signal generated by the control circuit 80.

Another version of the USB wall plate charger of the present invention incorporates at least two USB ports USB1, USB2. More specifically, and as mentioned previously, this version of the USB wall plate charger is also mountable on an AC wall outlet (not shown) and may be used for charging an external electronic device. The USB wall plate charger, in accordance with this alternative embodiment, includes a housing 2, the housing 2 having a first wall 6 and at least a second wall 4, 8, the housing 2 defining an interior cavity.

The USB wall plate charger also includes power outlet prongs 16 mounted on and extending outwardly from the first wall 6 of the housing 2, just like the version of the charger described earlier, the power outlet prongs 16 being receivable by an AC wall outlet to allow the USB wall plate charger to be mounted on and supported by the AC wall outlet.

In accordance with this alternative embodiment, the charger includes at least a first USB port USB1 and a second USB port USB2. Each of the first USB port USB1 and the second USB port USB2 is situated on one of the other walls 4, 8 of the housing 2. Each of the at least first USB port USB1 and the second. USB port USB2 has a charge pin (Pin 1), a DATA+ pin (Pin 3) and a DATA− pin (Pin 2). Furthermore, each of the at least first USB port USB1 and the second USB port USB2 is provided with a charge voltage on the charge pin (Pin 1) thereof for charging an external electronic device electrically connected to one of the first USB port USB1 and the second USB port USB2. Additionally, the first USB port USB1 is provided with a first configuration voltage on one of the DATA+ pin (Pin 3) and the DATA− pin (Pin 2) thereof and a second configuration voltage on one of the DATA− pin and the DATA+ pin thereof. The second USB port USB2 is similarly provided with a third configuration voltage on one of the DATA+ pin and the DATA− pin thereof and a fourth configuration voltage on one of the DATA− pin and the DATA+ pin thereof.

The USB wall plate charger described above further includes a power conversion circuit 82 situated within the interior cavity of the housing 2. The power conversion circuit 82 is electrically coupled to the power outlet prongs 16 and converts an AC voltage provided on the AC wall outlet 15 on which the USB wall plate charger is mounted to a DC voltage. The charge voltage provided to the charge pin (Pin 1) of each of the first USB port USB1 and the second USB port USB2 is derived from the DC voltage from the power conversion circuit 82.

This USB wall plate charger also includes a first charging profile configuration circuit 84 and a second charging profile configuration circuit 86. Each of the first charging profile configuration circuit 84 and the second charging profile configuration circuit 86 is situated within the interior cavity of the housing 2. The first charging profile configuration circuit 84 is responsive to the DC voltage from the power conversion circuit 82 and generates the first configuration voltage provided to one of the DATA+ pin and the DATA− pin of the first USB port USB1 and the second configuration voltage provided to one of the DATA− pin and the DATA+ pin of the first USB port. Similarly, the second charging profile configuration circuit 86 is responsive to the DC voltage from the power conversion circuit 82 and generates the third configuration voltage provided to one of the DATA+ pin and the DATA− pin of the second USB port USB2 and the fourth configuration voltage provided to one of the DATA− pin and the DATA+ pin of the second USB port.

The USB wall plate charger may further include two charging profile selection switches SW1, SW2 which may be joined together or which may be separate switches. More specifically, a first charging profile selection switch SW1 is mounted on the housing 2. The first charging profile selection switch SW1 is selectively changeable between at least a first state and a second state. The first charging profile selection switch SW1 is responsive to the first configuration voltage and the second configuration voltage generated by the first charging profile configuration circuit 84 and provides the first configuration voltage to the DATA+ pin and the second configuration voltage to the DATA− pin of the first USB port USB1 when the first charging profile selection switch SW1 is in the first state, and provides the first configuration voltage to the DATA− pin and the second configuration voltage to the DATA+ pin when the first charging profile selection switch SW1 is in the second state.

Similarly, a second charging profile selection switch SW2 is mounted on the housing 2. The second profile selection switch SW2 is selectively changeable between at least a first state and a second state. The second charging profile selection switch SW2 is responsive to the third configuration voltage and the fourth configuration voltage generated by the second charging profile configuration circuit 86 and provides the third configuration voltage to the DATA+ pin and the fourth configuration voltage to the DATA− pin of the second USB port USB2 when the second charging profile selection switch SW2 is in the first state, and provides the third configuration voltage to the DATA− pin and the fourth configuration voltage to the DATA+ pin of the second USB port USB2 when the second charging profile selection switch SW2 is in the second state.

As mentioned previously, the first charging profile selection switch SW1 and the second charging profile selection switch SW2 may be joined and switchable together to change the respective state of each of the first and second charging profile selection switches between at least the respective first state and the respective second state.

Preferably, the first charging profile configuration circuit 84 includes at least a first voltage divider network 30 and a second voltage network 32, the first voltage divider network 30 generating the first configuration voltage, and the second voltage divider network 32 generating the second configuration voltage. Similarly, the second charging profile configuration circuit 86 includes at least a third voltage divider network 88 and a fourth voltage divider network 90, the third voltage divider network 88 generating the third configuration voltage, and the fourth voltage divider network 90 generating the fourth configuration voltage.

The first voltage divider network 30 preferably includes at least a first resistor R19 and a second resistor R21, the first resistor R19 being connected in series with the second resistor R21. In a similar manner, the second voltage divider network 32 preferably includes at least a third resistor R20 and a fourth resistor R22, the third resistor R20 being connected in series with the fourth resistor R22.

Also, the third voltage divider network 88 preferably includes at least a fifth resistor R15 and a sixth resistor R17, the fifth resistor R15 connected in series with the sixth resistor R17, and the fourth voltage divider network 90 preferably includes at least a seventh resistor R16 and an eighth resistor R18, the seventh resistor R16 being connected in series with the eighth resistor R18.

The USB wall plate charger of the present invention also preferably includes a secondary AC power outlet 15. Preferably, the secondary AC power outlet 15 is situated on the front wall 4 of the housing so that it is easily accessible by the user to plug an electrical cord or electrical device thereinto. The secondary AC power outlet 15 is electrically coupled to the power outlet prongs 16 so that the secondary AC power outlet will be powered with 120 volts AC when the USB wall plate charger is mounted to a wall outlet.

As mentioned previously, the circuitry and features of the USB wall plate charger may be incorporated in a set top box 70 so that the set top box 70 is adapted for charging an external electronic device. The set top box 70 includes a housing 92, the housing 92 having at least one wall 72, 74 and defining an interior cavity. The set top box 70 further includes an AC power cord 94 extending from the housing 92 and being connectable to an AC outlet (not shown).

On the at least one wall 72, 74 of the housing 92 of the set top box 70 is situated at least one USB port USB1, USB2. The at least one USB port USB1, USB2 includes a charge pin, a DATA+ pin and a DATA− pin. The at least one USB port USB1, USB2 is provided with a charge voltage on the charge pin thereof for charging an external electronic device electrically connected thereto, a first configuration voltage on one of the DATA+ pin and the DATA− pin thereof and a second configuration voltage on one of the DATA− pin and the DATA+ pin thereof.

The set top box 70 also includes a power conversion circuit 82 situated within the interior cavity of the set top box housing 92. The power conversion circuit 82 is electrically coupled to the AC power cord 94 and converts an AC voltage provided on the AC outlet to which the set top box 70 is electrically connected through the AC power cord 94 to a DC voltage. The charge voltage provided to the charge pin of the at least one USB port USB1, USB2 is derived from the DC voltage from the power conversion circuit 82.

The set top box 70 also includes at least one charging profile configuration circuit 84 situated within the interior cavity of the housing 92. The at least one charging profile configuration circuit 84 or 86 is responsive to the DC voltage from the power conversion circuit 82 and generates the first configuration voltage provided to one of the DATA+ pin and the DATA− pin of the at least one USB port USB1, USB2 and the second configuration voltage provided to one of the DATA− pin and the DATA+ pin of the at least one USB port.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A USB wall plate charger, mountable on an AC wall outlet, for charging an external electronic device, which comprises:
   a housing, the housing having a first wall and at least a second wall, the housing defining an interior cavity;
   power outlet prongs mounted on and extending outwardly from the first wall of the housing, the power outlet prongs being receivable by an AC wall outlet to allow the USB wall plate charger to be mounted on and supported by the AC wall outlet;
   at least one USB port situated on the at least second wall of the housing, the at least one USB port including a charge pin, a DATA+ pin and a DATA− pin, the at least one USB port being provided with a charge voltage on the charge pin thereof for charging the external electronic device electrically connected to the at least one USB port, a first configuration voltage on one of the DATA+ pin and the DATA− pin thereof and a second configuration voltage on one of the DATA− pin and the DATA+ pin thereof;
   a power conversion circuit situated within the interior cavity of the housing, the power conversion circuit being electrically coupled to the power outlet prongs and converting an AC voltage provided on the AC wall outlet on which the USB wall plate charger is mounted to a DC voltage, the charge voltage provided to the charge pin of the at least one USB port being derived from the DC voltage from the power conversion circuit;
   at least one charging profile configuration circuit situated within the interior cavity of the housing, the at least one charging profile configuration circuit being responsive to the DC voltage from the power conversion circuit and generating the first configuration voltage provided to one of the DATA+ pin and the DATA− pin of the at least one USB port and the second configuration voltage provided to one of the DATA− pin and the DATA+ pin of the at least one USB port; and
   a charging profile selection switch mounted on the housing, the charging profile selection switch being selectively changeable between at least a first state and a second state, the charging profile selection switch being responsive to the first configuration voltage and the second configuration voltage provided by the at least one charging profile configuration circuit and providing the first configuration voltage to the DATA+ pin and the second configuration voltage to the DATA− pin of the at least one USB port when the charging profile selection switch is in the first state, and providing the first configuration voltage to the DATA− pin and the second configuration voltage to the DATA+ pin when the charging profile selection switch is in the second state.

2. A USB wall plate charger as defined by claim 1, wherein the at least one charging profile configuration circuit includes at least a first voltage divider network and a second voltage divider network, the first voltage divider network generating the first configuration voltage, and the second voltage divider network generating the second configuration voltage.

3. A USB wall plate charger as defined by claim 2, wherein the first voltage divider network includes at least a first resistor and a second resistor, the first resistor being connected in series with the second resistor; and
   wherein the second voltage divider network includes at least a third resistor and a fourth resistor, the third resistor being connected in series with the fourth resistor.

4. A USB wall plate charger as defined by claim 1, which further comprises:
   a photocell, the photocell being at least one of mounted on and exposed through a first opening formed in the housing, the photocell sensing ambient light conditions and generating an output signal in response thereto;
   a control circuit situated within the interior cavity of the housing, the control circuit being responsive to the output signal of the photocell and generating a control signal in response thereto; and
   a light emitting device, the light emitting device being at least one of mounted on and exposed through a second opening formed in the housing, the light emitting device selectively illuminating in response to the control signal generated by the control circuit.

5. A USB wall plate charger as defined by claim 1, which further comprises:
   a secondary power outlet, the secondary power outlet being situated on the at least second wall of the housing and electrically coupled to the power outlet prongs.

6. A USB wall plate charger, mountable on an AC wall outlet, for charging an external electronic device, which comprises:
   a housing, the housing having a first wall and at least a second wall, the housing defining an interior cavity;
   power outlet prongs mounted on and extending outwardly from the first wall of the housing, the power outlet prongs being receivable by an AC wall outlet to allow the USB wall plate charger to be mounted on and supported by the AC wall outlet;
   at least a first USB port and a second USB port, each of the at least first USB port and the second USB port being situated on the at least second wall of the housing, each of the first USB port and the second USB port having a charge pin, a DATA+ pin and a DATA− pin, each of the at least first USB port and the second USB port being provided with a charge voltage on the charge pin thereof for charging the external electronic device electrically connected to one of the first USB port and the second USB port, the first USB port being provided with a first configuration voltage on one of the DATA+ pin and the DATA− pin thereof and a second configuration voltage on one of the DATA− pin and the DATA+ pin thereof, the second USB port being provided with a third configuration voltage on one of the DATA+ pin and the DATA− pin thereof and a fourth configuration voltage on one of the DATA− pin and the DATA+ pin thereof;

a power conversion circuit situated within the interior cavity of the housing, the power conversion circuit being electrically coupled to the power outlet prongs and converting an AC voltage provided on the AC wall outlet on which the USB wall plate charger is mounted to a DC voltage, the charge voltage provided to the charge pin of each of the first USB port and the second USB port being derived from the DC voltage from the power conversion circuit; and a first charging profile configuration circuit and a second charging profile configuration circuit, each of the first charging profile configuration circuit and the second charging profile configuration circuit being situated within the interior cavity of the housing, the first charging profile configuration circuit being responsive to the DC voltage from the power conversion circuit and generating the first configuration voltage provided to one of the DATA+ pin and the DATA− pin of the first USB port and the second configuration voltage provided to one of the DATA− pin and the DATA+ pin of the first USB port, the second charging profile configuration circuit being responsive to the DC voltage from the power conversion circuit and generating the third configuration voltage provided to one of the DATA+ pin and the DATA− pin of the second USB port and the fourth configuration voltage provided to one of the DATA− pin and the DATA+ pin of the second USB port;

a first charging profile selection switch circuit mounted on the housing, the first charging profile selection switch circuit being selectively changeable between at least a first state and a second state, the first charging profile selection switch circuit being responsive to the first configuration voltage and the second configuration voltage generated by the first charging profile configuration circuit and providing the first configuration voltage to the DATA+ pin and the second configuration voltage to the DATA− pin of the first USB port when the first charging profile selection switch circuit is in the first state, and providing the first configuration voltage to the DATA− pin and the second configuration voltage to the DATA+ pin when the first charging profile selection switch circuit is in the second state; and a second charging profile selection switch circuit mounted on the housing, the second charging profile selection switch circuit being selectively changeable between at least a first state and a second state, the second charging profile selection switch circuit being responsive to the third configuration voltage and the fourth configuration voltage generated by the second charging profile configuration circuit and providing the third configuration voltage to the DATA+ pin and the fourth configuration voltage to the DATA− pin of the second USB port when the second charging profile selection switch circuit is in the first state, and providing the third configuration voltage to the DATA− pin and the fourth configuration voltage to the DATA+ pin of the second USB port when the second charging profile selection switch circuit is in the second state.

7. A USB wall plate charger as defined by claim 6, wherein the first charging profile selection switch circuit and the second charging profile selection switch circuit are joined and switchable together to change the respective state of each of the first and second charging profile selection switch circuits between at least the respective first state and the respective second state.

8. A USB wall plate charger as defined by claim 6, wherein the first charging profile configuration circuit includes at least a first voltage divider network and a second voltage divider network, the first voltage divider network generating the first configuration voltage, and the second voltage divider network generating the second configuration voltage; and wherein the second charging profile configuration circuit includes at least a third voltage divider network and a fourth voltage divider network, the third voltage divider network generating the third configuration voltage, and the fourth voltage divider network generating the fourth configuration voltage.

9. A USB wall plate charger as defined by claim 8, wherein the first voltage divider network includes at least a first resistor and a second resistor, the first resistor being connected in series with the second resistor;

wherein the second voltage divider network includes at least a third resistor and a fourth resistor, the third resistor being connected in series with the fourth resistor;

wherein the third voltage divider network includes at least a fifth resistor and a sixth resistor, the fifth resistor being connected in series with the sixth resistor; and wherein the fourth voltage divider network includes at least a seventh resistor and an eighth resistor, the seventh resistor being connected in series with the eighth resistor.

10. A USB wall plate charger as defined by claim 6, which further comprises:

a photocell, the photocell being at least one of mounted on and exposed through a first opening formed in the housing, the photocell sensing ambient light conditions and generating an output signal in response thereto;

a control circuit situated within the interior cavity of the housing, the control circuit being responsive to the output signal of the photocell and generating a control signal in response thereto; and a light emitting device, the light emitting device being at least one of mounted on and exposed through a second opening formed in the housing, the light emitting device selectively illuminating in response to the control signal generated by the control circuit.

11. A set top box adapted for charging an external electronic device, which comprises:

a housing, the housing having at least one wall and defining an interior cavity;

an AC power cord extending from the housing and being connectable to an AC outlet;

at least one USB port situated on the at least one wall of the housing, the at least one USB port including a charge pin, a DATA+ pin and a DATA− pin, the at least one USB port being provided with a charge voltage on the charge pin thereof for charging an external electronic device electrically connected thereto, a first configuration voltage on one of the DATA+ pin and the DATA− pin thereof and a second configuration voltage on one of the DATA− pin and the DATA+ pin thereof;

a power conversion circuit situated within the interior cavity of the housing, the power conversion circuit being electrically coupled to the AC power cord and converting an AC voltage provided on the AC outlet to which the set top box is electrically connected through the AC power cord to a DC voltage, the charge voltage provided to the charge pin of the at least one USB port being derived from the DC voltage from the power conversion circuit;

at least one charging profile configuration circuit situated within the interior cavity of the housing, the at least one charging profile configuration circuit being responsive to the DC voltage from the power conversion circuit and generating the first configuration voltage provided to one of the DATA+ pin and the DATA− pin of the at least one USB port and the second configuration voltage provided to one of the DATA− pin and the DATA+ pin of the at least one USB port; and a charging profile selection switch mounted on the housing, the charging profile selection switch being selectively changeable between at least a first state and a second state, the charging profile selection switch being responsive to the first configuration voltage and the second configuration voltage provided by the at least one charging profile configuration circuit and providing the first configuration voltage to the DATA+ pin and the second configuration voltage to the DATA− pin of the at least one USB port when the charging profile selection switch is in the first state, and providing the first configuration voltage to the DATA− pin and the second configuration voltage to the DATA+ pin when the charging profile selection switch is in the second state.

* * * * *